US006963605B2

(12) United States Patent
Laurent-Chatenet

(10) Patent No.: US 6,963,605 B2
(45) Date of Patent: Nov. 8, 2005

(54) METHOD FOR ESTIMATING THE MOTION BETWEEN TWO DIGITAL IMAGES WITH MANAGEMENT OF MESH OVERTURNING AND CORRESPONDING CODING METHOD

(75) Inventor: Nathalie Laurent-Chatenet, Vignoc (FR)

(73) Assignees: France Telecom (SA), Paris (FR); Telediffusion de France (SA), Paris (FR)

( * ) Notice: Subject to any disclaimer, the term of this patent is extended or adjusted under 35 U.S.C. 154(b) by 503 days.

(21) Appl. No.: 10/149,330

(22) PCT Filed: Dec. 7, 2000

(86) PCT No.: PCT/FR00/03441

§ 371 (c)(1),
(2), (4) Date: Sep. 12, 2002

(87) PCT Pub. No.: WO01/43446

PCT Pub. Date: Jun. 14, 2001

(65) Prior Publication Data

US 2003/0063672 A1 Apr. 3, 2003

(30) Foreign Application Priority Data

Dec. 9, 1999 (FR) .......................................... 99 15568

(51) Int. Cl.⁷ .............................................. H04B 1/66
(52) U.S. Cl. ............. 375/240; 375/240.16; 375/240.15; 375/240.12; 375/240.26; 375/240.08; 375/240.09; 382/238; 382/235; 382/243; 382/240; 382/241; 348/699
(58) Field of Search ........................... 375/240, 240.16, 375/240.15, 240.12, 240.26, 240.08, 240.09; 382/238, 235, 243, 240, 241; 348/699

(56) References Cited

U.S. PATENT DOCUMENTS 6,047,088 A * 4/2000 van Beek et al. ............ 382/243
6,148,026 A * 11/2000 Puri et al. ................... 375/240
6,236,680 B1 * 5/2001 Chun et al. ............. 375/240.01

FOREIGN PATENT DOCUMENTS

FR 2783123 3/2000

OTHER PUBLICATIONS

Lechat et al. , *Scalable Image Coding with Fine Granularity Based on Heirarchical Mesh*, Proceedings of the SPIE, vol. 3653, pp. 1130–1142, Jan. 1999.
Laurent et al., *Limitation of Triangles Overlapping in Mesh-Based Motion Estimation Using Augmented Lagrangian*, Proceedings 1998 IEEE, vol. 2, pp. 223–224, Oct. 1998.
Chou et al., *Overlapping Patch Elimination Algorithm for Deformable Mesh Video Coding*, Electronics Letters, vol. 33, No. 13, pp. 1133–1134, Jun. 1997.
Dudon et al., *Triangular Active Mesh for Motion Estimation*, Signal Processing Image Communication, vol. 10, No. 1–3, pp. 21–24, Jul. 1997.
Wang et al., *Use of Two–Dimensional Deformable Mesh Structures for Video Coding, Part I–The Synthesis Problem: Mesh–Based Function Approximation and Mapping*, IEEE Transactions on Circuits and Systems for Video Technology, vol. 6, No. 6, pp. 636–646, Dec. 1996.

* cited by examiner

*Primary Examiner*—Shawn S. An
(74) *Attorney, Agent, or Firm*—Patterson, Thuente, Skaar & Christensen, P.A.

(57) ABSTRACT

The invention relates to a method for estimating the motion between two digital images and to the use of this method for coding images. The aim of the method is to eliminate the disturbances caused by the mesh being overturned during the motion estimation process. According to the invention, the method consists of carrying out a first motion estimation in order to identify the faulty mesh, i.e. the mesh that is overturning or is overlapping after the displacement vectors have been applied; then carrying out a second motion estimation, excluding at least said faulty mesh, in order to minimize prediction error on the remaining mesh of the model.

34 Claims, 4 Drawing Sheets

METHOD FOR ESTIMATING THE MOTION BETWEEN TWO DIGITAL IMAGES WITH MANAGEMENT OF MESH OVERTURNING AND CORRESPONDING CODING METHOD

BACKGROUND OF THE INVENTION

1. Field of the Invention

The present invention concerns a method for estimating the motion between two digital images and to the use of this method for coding images.

The motion between two images, $I_1$ and $I_2$, is generally defined in the form of a field of motion associated with either of the images $I_1$ and $I_2$ and constituted by motion vectors each related to a point of the image concerned. The motion vector is a two dimensional vector representative of the position difference between the pixel of the image $I_1$ and the associated pixel of the image $I_2$ relating to the same physical point of the filmed scene.

The invention can be applied in all fields of imagery requiring an analysis of the movements or disparities between two images. This method can also form part of applying on follow up objects in videos (for the purposes in particular of creating and annotating contents by the objects in a standardisation context MPEG4 and 7).

So as to obtain a motion field, it is known to break down the image into finite elements. These finite elements, which can be triangles or quadrangles, are determined by a mesh whose nodes correspond to the vertices of the finite elements. A motion vector is calculated for each mesh node. Then, via an interpolation function, it is possible to deduce from this a motion vector for each point of the image. The motion field is thus determined by the retained model of finite elements which defines the mesh used to partition the image into finite elements and the interpolation function able to calculate the motion vector at any point of the image.

The mesh used can be regular or irregular and needs to be sufficiently dense so as to model as best as possible the motion between the two images but without requiring an excessive number of calculations or data to be transmitted.

The calculation of the motion vectors of the nodes of the mesh can be carried out according to various methods. First of all, there are matching methods consisting of testing a discrete set of possible values of motion vectors for each node of the mesh and of retaining the best vectors according to a given criterion. A second method known as the transform method consists of using the properties of the Fourier transform and its extensions so as to convert the motion into a phase displacement in the transformed space. Finally, there is a third method known as the differential method which is able to determine the motion vectors by optimising a mathematical criterion (for example by optimising a quadratic error between the image and its value predicted by the motion field). This method is the most used one for the motion estimation with modelising by finite elements. A traditional differential method for optimising motion vectors is the Gauss-Newton method. The present application concerns more particularly the motion estimation method family using a model of finite elements and a differential method by optimising a prediction error for determining the field of motion.

Although widely prevalent, this type of method does have one major drawback. Under the effect of the field of the motion vectors of the nodes of the mesh, the initial mesh on the start image is transformed into a new mesh on the other image. Then mesh overturnings may occur. In fact, the ductile mesh used to partition the image defines a continuous representation of a field of motion, whereas the real motion of the filmed scene is naturally discontinuous. Various elements of the scene can appear or disappear from one image to another, which then generate discontinuities. This is expressed at the level of the meshing by a pulling or an overturning or an overlapping of the meshes of the model. A mesh overturning and overlapping example is illustrated by the FIGS. 1A and 1B. FIG. 1A shows a ductile triangular meshing before applying motion vectors to the nodes of this meshing, and FIG. 1B shows the same meshing after applying said motion vectors. Four nodes with the references A, B, C and D are indicated on these figures. These nodes constitute the vertices of two triangles ABC and BCD. The triangle ABC is hatched on the two figures. It can be observed that, after applying the motion vectors (FIG. 1B), the triangle ABC has overturned and all the triangles whose vertex is the node A cover the triangle BCD, thus destroying the continuity property any meshing needs to check. This overlapping of meshes then brings about a visual deterioration. Thus, one aim of the invention is to eliminate this visual deterioration.

2. Description of the Related Art

At the present time, there are two techniques for resolving these mesh overturning problems: one technique known as the "post-processing" technique and the technique consisting of establishing non-overturning constraints when estimating the motion.

The "post-processing" technique can be implemented according to two possible scenarios: the first scenario corresponding to an a posteriori correction consists of applying as such the calculated motion vectors, of detecting the faulty motion vectors, and then of correcting their value so as to inhibit the overturnings; the second scenario consists of proceeding in an iterative way by applying at each iteration a portion of the expected motion to the nodes so that there is no overturning and by thus looping until the process has converged. However, given the fact that the post-processing methods act once the motion estimation is achieved, the result is sub-optimum because the motion vectors are corrected independently of their global contribution in minimising the prediction error.

Another solution consists of optimising the motion field by integrating non-overturning constraints of the triangles when estimating the motion vectors. The motion estimation is modified by adding to the prediction quadratic error an augmented Lagrangian for correcting the deformation of the triangles when the latter approach the zero area triangle. This technique is described in the article entitled "Limitation of triangles overlapping in mesh-based motion estimation using augmented Lagrangian", International Conference Image Processing, Chicago, October 1998. This latter technique would effectively make it possible to determine the optimum solution to the problem if the motion field were continuous, which is not the case.

OBJECTS AND SUMMARY OF THE INVENTION

The solution adopted by the invention to resolve the problem of overturnings of meshes consists of making a first motion estimation so as to detect the faulty meshes, that is overturning or overlapping meshes after applying motion vectors and of carrying out a second motion estimation by excluding at least said faulty meshes so as to minimise the prediction error on the other meshes of the model.

Thus, the invention concerns a method for estimating the motion between two digital images $I_1$ and $I_2$ with luminance $Y_1$ and $Y_2$, and intended to generate for each point of co-ordinates x, y of the image $I_2$ a motion vector $\vec{d}(x, y)=(d_x, d_y)$ so as to form an image $\hat{I}_2$ from the image $I_1$ with luminance $\hat{Y}_2(x, y)=Y_1(x+d_x, y+d_y)$ which is an approximation of the image $I_2$, comprising the following steps:

(a)—defining an initial model of finite elements comprising a mesh whose nodes are points of the image $I_1$, a motion vector at each node of said mesh, and an interpolation formula so as to calculate the value of the motion vector of each point of the image $I_1$ on the basis of the values of the motion vectors of the nodes of the mesh to which it belongs, (b)—optimising globally the values of all the motion vectors of the model according to a differential method, (c)—applying said motion vectors to said mesh of the initial model so as to generate a moved mesh representative of the image $\hat{I}_2$, (d)—determining faulty areas in said moved mesh, said faulty areas being determined so that they contain at least one or several meshes overturning or overlapping after applying the motion vectors, all said meshes of the moved meshwork overturning or overlapping after applying the motion vectors being contained in said faulty areas, (e)—creating a set S including all the nodes of the moved mesh contained in the faulty areas, (f)—taking up again the initial model defined in step (a), reinitialising the values of all the motion vectors of said initial model and re-optimising the values of the motion vectors of said model according to step (b) by excluding from the model the motion vectors of the nodes of said set S.

This double optimisation of the motion vectors makes it possible to determine the optimal motion vectors for the continuous area (the area allowing a bijection between the image $I_1$ and the image $I_2$) of the mesh and of eliminating the disturbances brought by the motion vectors of the faulty areas.

As a variant, it is possible to re-optimise the motion vectors of step (f) by taking up again, not the initial model, but a model corresponding to the model obtained at the end of an iteration of the optimisation carried out in step (b) for which the optimised motion vectors do not generate any overturning of the meshes and so as to reduce the processing time of step (f).

It is also possible to provide a model of finite elements comprising a hierarchical mesh. In this case, the invention concerns a method for estimating the motion between two digital images, $I_1$ and $I_2$, with luminance $Y_1$ and $Y_2$, and intended to generate for each point of coordinates x, y of the image $I_2$ a motion vector $\vec{d}(x, y)=(d_x, d_y)$ so as to form an image $\hat{I}_2$ from the image $I_1$ with luminance $\hat{Y}_2(x, y)=Y_1(x+d_x, y+d_y)$ which is an approximation of the image $I_2$, comprising the following steps:

(a)—defining an initial model of finite elements comprising a hierarchical mesh whose nodes are points of the image $I_1$, said hierarchical mesh comprising N+1 mesh levels (0 . . . N) and each node of said mesh belonging to at least one mesh level, a motion vector at each node of said hierarchical mesh, and an interpolation formula so as to calculate the value of the motion vector of each point of the image $I_1$ on the basis of the values of the motion vectors of the nodes of the mesh to which it belongs, (b)—optimising globally, mesh level by mesh level, the values of all the motion vectors of the model according to a differential method by starting from the coarsest mesh level (level 0) and depending at each level on the optimised values of the lower mesh level, (c)—applying said motion vectors to said hierarchical mesh of the initial model so as to generate a moved mesh representative of the image $\hat{I}_2$, (d)—determining the faulty areas at each mesh level of the moved mesh, said faulty areas being determined so that they each contain at least one or several overturning or overlapping meshes after applying the motion vectors, all said meshes of said hierarchical meshwork overturning or overlapping after applying the motion vectors being contained in said faulty areas, the faulty areas of the mesh of mesh level i including at least the faulty areas of the mesh of mesh level i−1;

(e)—creating a set $S_i$ for each mesh level i, said set $S_i$ including all the nodes of the mesh level i of the moved mesh contained in the faulty areas, (f)—taking up again the initial model defined in step (a), reinitialising the values of all motion vectors of said initial model and re-optimising the values of the motion vectors of said model according to step (b) by excluding at each mesh level i of the model the motion vectors of the nodes of the corresponding set $S_i$.

The implementation of this method to a sequence of video images makes it possible to manage the disappearances of objects (overturnings of meshes) between consecutive images of the sequence by taking $I_2$ consecutive to $I_1$. The appearances of objects between consecutive sequence images can also be managed by taking $I_1$ consecutive to $I_2$.

Finally, the invention also concerns a method for coding a sequence of digital images aimed at producing a binary train representative of said sequence of images, characterised in that it comprises the following steps:

carrying out a motion estimation for each pair of consecutive images of the sequence by implementing the previously mentioned motion estimation method, the motion estimation being front or rear, and introducing, into the binary train, data for describing the first image of said sequence, data concerning the structure of the mesh used for the motion estimation step, the vector displacements obtained at the end of said motion estimation step and faulty data for describing the faulty areas determined during the motion estimation step.

The invention also concerns a method for coding a sequence of digital images aimed at producing a binary train representative of said sequence of images, said method being characterised in that it comprises the following steps:

carrying out for each pair of consecutive images of the sequence a front motion estimation and a rear motion estimation by implementing for each of the motion estimations the motion estimation method of the invention, and introducing, into the binary train, data for describing the first image of said sequence of images, data concerning the structure of the mesh used for the motion estimation step, motion vectors which for each image are a linear combination of the motion vectors obtained at the end of the two preceding motion estimation steps, and faulty data to represent the faulty areas determined during the two preceding motion estimation steps.

Advantageously, the binary train further comprises a bit indicating whether or not the motion estimation step of each of the images has detected faulty areas in the mesh.

BRIEF DESCRIPTION OF THE DRAWINGS

Other characteristics and advantages of the invention shall appear from a reading of the following detailed description with reference to the accompanying drawings on which.

DESCRIPTION OF THE PREFERRED EMBODIMENTS

Figure 1A:
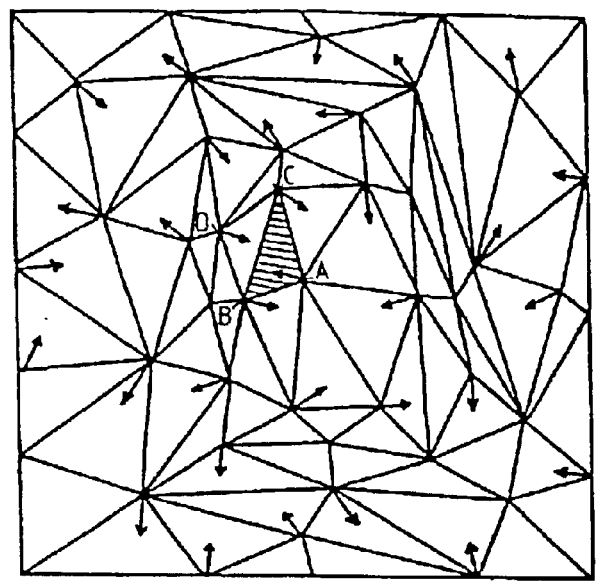
FIG. 1A, already described, represents a mesh on the image $I_1$ and the motion vectors associated with the nodes of this mesh for generating the image $I_2$.

Let us consider two digital images $I_1$ and $I_2$ belonging to a given video sequence and with respective luminance $Y_1$ and $Y_2$. The method of the invention consists of carrying out a first motion estimation so as to generate at each point P of coordinates (x, y) of the image $I_2$ a motion vector $\vec{d}$(x, y)=($d_x$, $d_y$). This vector is defined as being the vector making it possible to construct from the image $I_1$ an image $\hat{I}_2$ with luminance $\hat{Y}_2$(x, y)=$Y_1$(x+$d_x$, y+$d_y$) which is an approximation of $I_2$. The motions are thus defined from the image $I_1$ to the image $I_2$. A point of coordinates (x, y) in the image $I_1$ has the coordinates (x+$d_x$, y+$d_y$) in the image $I_2$.

In the rest of the description, a front motion estimation between the images $I_1$ and $I_2$ is such that, when the image $I_2$ is consecutive to the image $I_1$ in the sequence of images, the motion is estimated in the direction $I_1$ towards $I_2$. For a rear motion estimation, the motion is estimated in the direction $I_2$ towards $I_1$.

The sought-after motion field is defined by a model of finite elements. In the continuation of the disclosure, the finite elements are regarded as triangles without imposing any limitation of the scope of the present application to this form of finite elements. The model of finite elements thus comprises a triangular mesh, motion vectors defined at the nodes of the mesh, said nodes corresponding to the vertices of the triangles, and an interpolation formula for calculating the motion vector of the points inside the triangles.

The interpolation formula used to calculate the field of motion at any point of the domain of the image $I_2$ is the following:

if the point P of coordinates (x, y) in the image $I_2$ is considered as belonging to the triangle e with vertices $P_i$, $P_j$ and $P_k$ with respective coordinates ($x_i$, $y_i$), ($x_j$, $y_j$) and ($x_k$, $y_k$), its motion vector is equal to:

$$\vec{d}(x, y) = \sum_{l=i,j,k} \psi_1^e(x, y) \cdot \vec{d}(x_1, y_1)$$

where $$\psi_1^e$$

represents a base function associated with the triangle e.

In the case of an affine interpolation, the $\psi_i^e$(x, y) represent the barycentric coordinates of the point P in the triangle e with vertices $P_i$, $P_j$, $P_k$. These functions are defined by the following equation:

$$\begin{cases} \psi_1^e(x, y) = \alpha_1 + \beta_1 x + \gamma_1 y & (x, y) \in e \\ \sum_{l=i,j,k} \psi_1^e(x, y) = 1 & \text{et } \alpha_1, \beta_1, \gamma_1 \in \mathbb{R} \\ \psi_1^e(x, y) = 0 & (x, y) \notin e \end{cases}$$

so, $\psi_i^e(x, y) = \dfrac{x_j y_k - x_k y_j + (y_j - y_k)x + (x_k - x_j)y}{x_j y_k - x_k y_j + x_k y_i - x_i y_k + x_i y_j - x_j y_k}$ The affine functions $$\psi_j^e(x, y) \text{ and } \psi_k^e(x, y)$$

are deduced from the function $$\psi_i^e(x, y)$$

by circularly permuting the indices i, j, k. It is also possible to use more open-ended models of finite elements, the functions $\psi$ then being able to be extended to polynomials of degree n≧2 but the interpolation formula of the motion vectors then introduces first order, second order derivatives and so on . . . A miscellaneous choice of models of finite elements is proposed in the work "Handbook of Numerical Analysis" by P. G. Ciarlet and J. L Lions, Volume 2, pp 59–99, Ed. North Holland.

Figure 2:
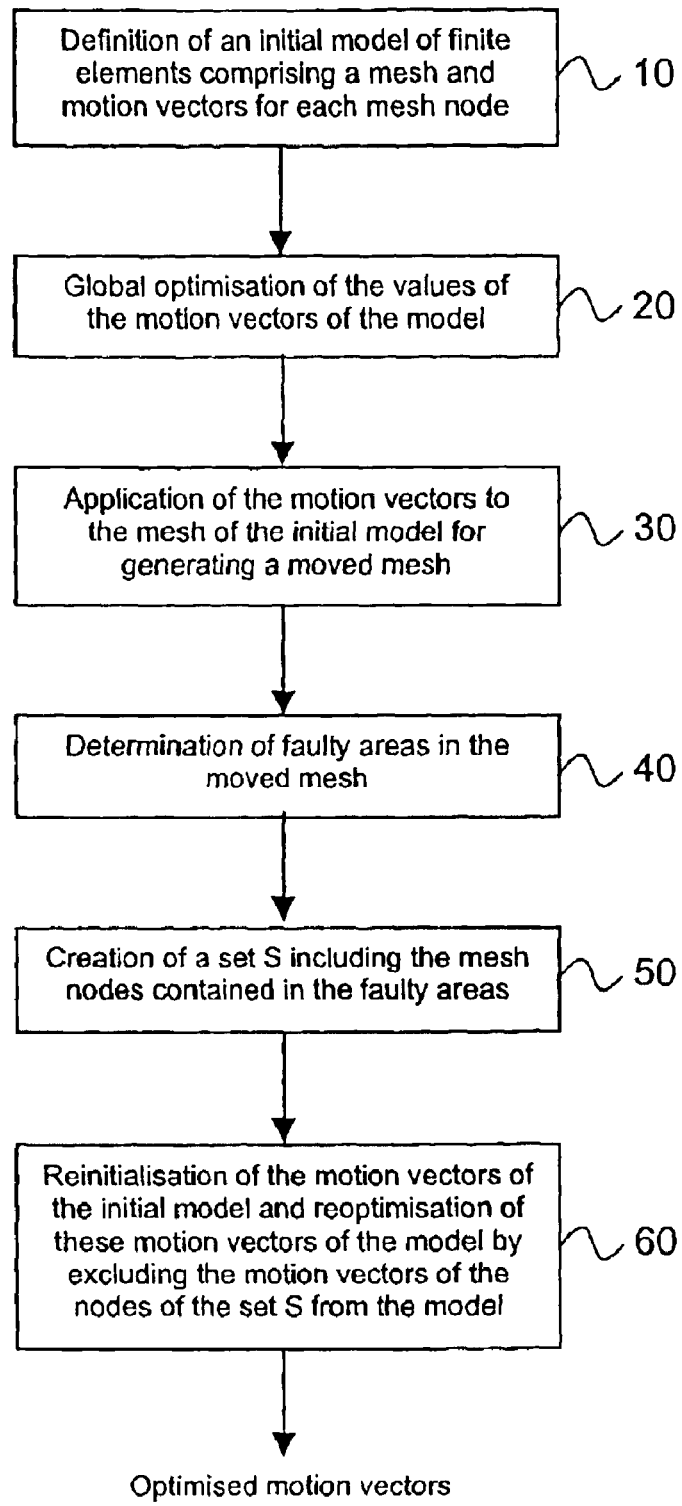
FIG. 2 represents a first embodiment of the method of the invention.

According to a first embodiment shown on FIG. 2, the motion estimation method relates to a model of finite elements including a non-hierarchical mesh.

According to a first step 10, an initial model of finite elements is defined by selecting points of the image $I_1$ according to an initial triangular mesh. This mesh can be defined in some ways, for example according to the requirements of the application or to prior knowledge or to the motion already calculated between two preceding images of the same video sequence. A zero value motion vector is then associated with each node of the mesh. The interpolation formula defined previously is also a data element of the initial model.

According to a second step 20, the value of the motion vectors of the model are optimised according to a differential method, for example the Gauss-Newton method or its Marquardt extension described in the thesis entitled "Représentation et codage de séquences vidéo par maillages 2D deformables" by Patrick Lechat, page 162, IRISA, Rennes, October 1999. This method consists of looking for all the nodal motion vectors which minimise the prediction error between the images $\hat{I}_2$ and $I_2$. This prediction error is defined by:

$$E = \sum_{(x,y) \in D} DFD^2(x, y)$$

with DFD(x, y)=$Y_2$(x, y)−$Y_1$(x+$d_x$, y+$d_y$)

where D is the domain of the images $I_1$ and $I_2$

Advantageously, a local refining of the mesh via the division of the triangles is then carried out when the prediction error E on certain triangles of the mesh between the image $\hat{I}_2$ and the image $I_2$ is too high. In order to achieve this, the difference E is calculated between the image $\hat{I}_2$ and the image $I_2$ on each triangle of the mesh and this triangle is divided if this difference is greater than a threshold value. Then the value of the motion vectors is re-optimised on the basis of this new mesh by repeating the preceding optimisation step. Thus, this sequence of steps (optimisation of the motion vectors, calculation of E for each triangle, division of triangles) is repeated until a stop criterion is satisfied. This stop criterion may for example be a predetermined number of triangles to be reached at the end of the local refining step. It is also possible to stop the method when the differences E of all the triangles are less than a threshold difference.

Figure 1B:
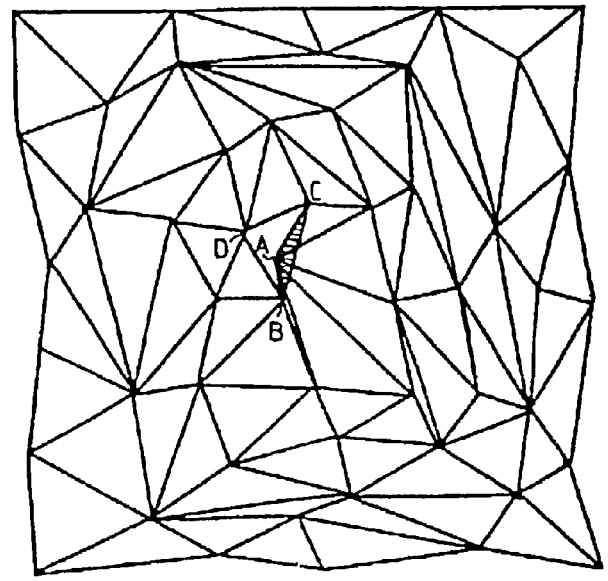
FIG. 1B, already described, shows the mesh of FIG. 1A after applying the motion vectors.

At the end of this first motion estimation, a model is obtained as shown on FIG. 1A with a given mesh and motion vectors for each node of this mesh. After applying the motion vectors to the nodes of the mesh (FIG. 1B), certain triangles of the mesh overturn and others overlap. This application step is referenced 30 on the diagram of FIG. 2. In the example of FIG. 1B, the triangle ABC overturns and the triangles from which a vertex is the node A partly cover the triangle BCD.

According to the invention, the overturning areas are determined in the mesh of the model in a step 40. These areas are made up of triangles which, after applying the motion vectors, either overturn or overlap other triangles. The mesh of FIG. 1A comprises an overturning area which is shown on FIG. 3 and which includes all the triangles from which a vertex is the node A. This area is delimited by the hexagon BCEFGH.

Figure 3:
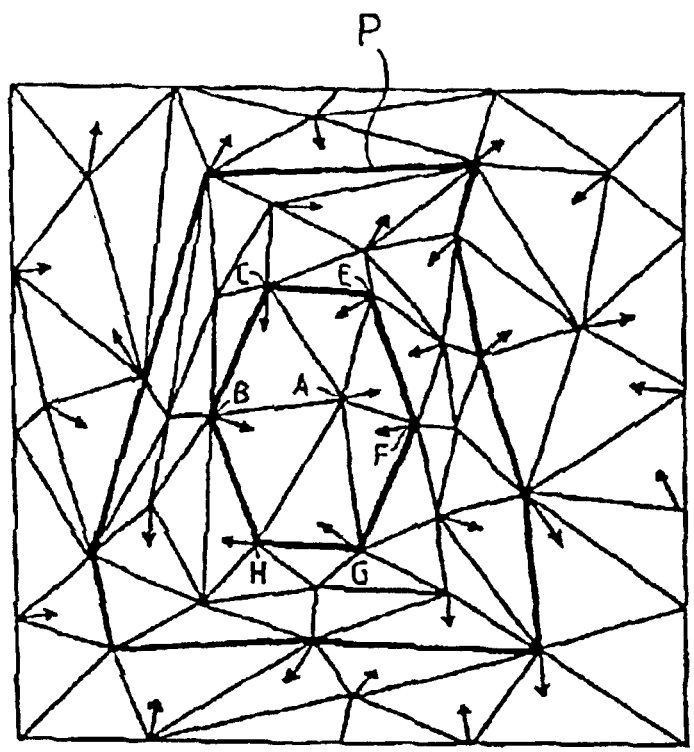
FIG. 3 shows an overturning area and a faulty area in the mesh of FIG. 1A.

According to the invention, a set S is then created including all the nodes belonging to the overturning areas of the mesh (step with the reference 50 on FIG. 2). In the example of FIG. 3, the set S includes the nodes A, B, C, E, F, G and H.

Advantageously, the set S is enlarged with the peripheral nodes of the overturning area so as to avoid any risk of overturning of the peripheral triangles in the overturning area during a subsequent processing of the mesh (for example a new optimisation of the motion vectors). Then an area including the overturning area, known as a faulty area, is defined. For example, let us consider the k-disk of the overturning area in question. A faulty area representing the 2-disk of the hexagon BCEFGH is shown on FIG. 3. This faulty area is delimited by the polygon P shown by the thick lines on the figure.

During the next step referenced 60 on FIG. 2, all the motion vectors of the initial model are then re-initialised, that is all the motion vectors of the nodes of the mesh of FIG. 1A, and the values of these motion vectors are re-optimised by excluding from the model the motion vectors of the nodes of the set S and this by reapplying the Gauss-Newton method.

The motion vectors obtained at the end of the method are optimal for the continuous area of the mesh because the disturbance generated by the faulty areas has been eliminated.

As a variant, it is possible to carry out re-optimisation of the motion vectors of the step (f) by taking up again, not the initial model, but a model corresponding to the model obtained at the end of an iteration of the optimisation carried out in the step (b) for which the motion vectors do not generate any overturning of meshes. This therefore makes it possible to reduce the time for processing the step (f).

The motion of the nodes of the faulty areas of the image $I_2$ is not estimated with respect to the image $I_1$ since these areas correspond to a portion of the image $I_2$ which is not present in the image $I_1$.

Furthermore, it may be that the absence of certain nodes in the mesh creates degeneracies that generate problems of matrix conditioning at the time of optimising the motion vectors. Also, so as to avoid these matrix conditioning problems and accelerate the convergence of the Gauss-Newton method, it is possible to apply the second optimisation step to all the nodes of the mesh by firstly assuming that the difference of luminance between the images $I_1$ and $I_2$ for the faulty areas is zero.

As a variant, it is also possible to correct the position of the nodes of the faulty areas of the mesh so as to limit the risks of degeneracies during optimisations of the motion vectors to follow (especially when estimating the motion of the other images of the sequence of images including the images $I_1$ and $I_2$). This local correction of the mesh can be carried out for example according to the barycenter method described in the thesis entitled "Représentation et codage de séquences vidéo par maillages 2D déformables" by Patrick Lechat, page 174, IRISA, Rennes, October 1999.

Figure 4:
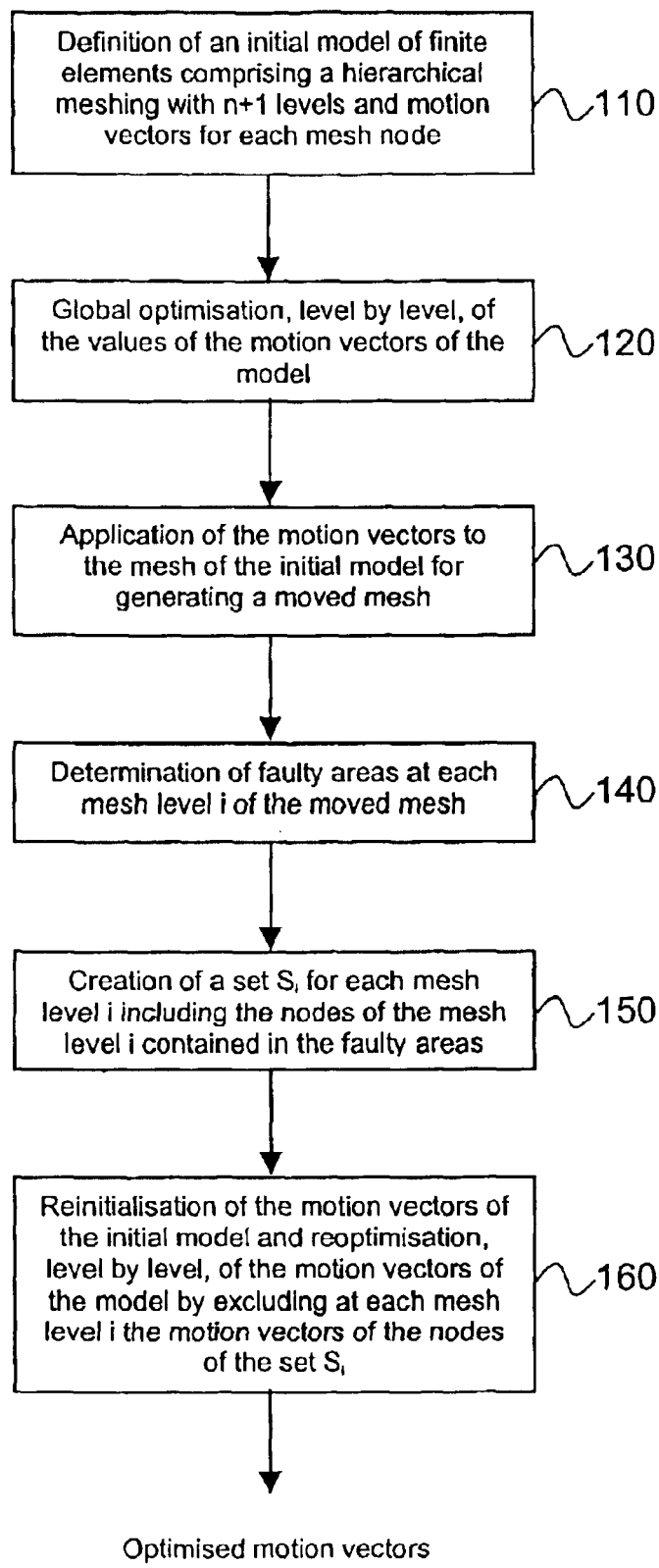
FIG. 4 represents a second embodiment of the method of the invention.

According to a second embodiment shown on FIG. 4, the model defined during a first step 110 of the motion estimation method includes a hierarchical mesh which is made up of several nested meshes each corresponding to one mesh level. The mesh levels are numbered from 0 to N. The mesh level 0 corresponds to the coarser mesh and the mesh level N corresponds to the denser mesh. The level mesh i is obtained by subdividing the meshes of the meshwork of level i−1. Thus, all the nodes of the mesh level i belong to the mesh level I+1. The motion vectors associated with the nodes of the hierarchical mesh are initially zero and the interpolation function is the same as for the first embodiment.

According to a step referenced 120, the value of the motion vectors of the nodes of the model is then optimised by applying the Gauss-Newton method to each mesh level by starting by the mesh level 0. The optimisation of the motion vectors is carried out mesh level by mesh level, the values of the motion vectors of the nodes common to the mesh levels i and i+1 obtained at the end of optimisation at the level i being taken as initial values for these nodes during optimisation of the vectors at the level i+1. The motion vectors of the new nodes at the mesh level i+1 are initialised by values obtained via the interpolation of the values of the motion vectors of the nodes of the level i. Then, in a step referenced 130, the calculated motion vectors are applied to the hierarchical mesh of the model which discloses the faulty areas when the latter exist.

In this embodiment, the determination of the overturning or faulty areas (step 140) is carried out at each mesh level by starting with the coarser mesh level (level 0). The faulty areas of the mesh at the mesh level i include necessarily the faulty areas of the mesh at the level i−1. Thus, the finest mesh level (level N) includes the greatest number of faulty areas and the faulty areas the most extended. It would be possible to envisage only carrying out a determination of the overturning or faulty areas on the finest mesh, but it is essential to take account of the fact that certain faulty areas can disappear when the mesh becomes finer. These temporary faulty areas also disturb optimisation of the motion vectors and thus need to be identified.

Once said faulty areas are identified, it is then possible to next create, for each mesh level i, a set $S_1$ containing the nodes of the faulty zones of the mesh at the level i (step 150). It is to be noted that, for any $i \in [0 \ldots N]$, $S_i \subset S_{i+1}$.

Then, the initial model is taken up again; the value of the motion vectors of the nodes of the hierarchical mesh is re-initialised and the value of the motion vectors of the model is re-optimised by excluding from the model the motion vectors of the nodes of the faulty areas by applying the Gauss-Newton method to each mesh level (step 160). This re-optimisation is first of all conducted on the motion vectors of the mesh nodes of level 0 by excluding the nodes of the set $S_o$, then on the motion vectors of the nodes of the mesh of level 1 by excluding the nodes of the set $S_1$, and so on up to the level N.

So as to improve the position of the nodes of the moved mesh associated with the image $\hat{I}_2$, it is possible to estimate the motion between the image $\hat{I}_2$ and the image $I_2$. In order to do this, a mesh is taken which is composed of the moved mesh for the continuous area of the image $I_2$ and of the initial mesh (that is the mesh of $I_1$) for the faulty areas. The mesh for the faulty areas can be corrected according to the barycenter method. Then a motion estimation is made between the images $\hat{I}_2$ and $I_2$ with this mesh and thus small value motion vectors are obtained (because $\hat{I}_2$ is an approximation of $I_2$). By applying these motion vectors to the nodes of the moved mesh of the image $I_2$, a new moved mesh is obtained with the position of its nodes having improved.

In the two embodiments referred earlier, the first and second motion estimations of the method are carried out in the same direction: they are either front to detect the disappearances of objects, or rear to detect the appearances of objects.

Again, in a more elaborate embodiment, it is possible to carry out a first motion estimation which is a front motion estimation so as to detect the faulty areas corresponding to disappearances of objects, a second motion estimation which is a rear motion estimation so as to detect the faulty areas corresponding to appearances of objects, and finally a last motion estimation, either front or rear, by excluding from the estimation the faulty areas detected by the preceding estimations so as to exclude from the differential calculation all the meshes which could introduce errors.

The invention also concerns a method for coding fixed or animated images with flow reduction with a view to transmit or store them. Such a method generates a binary train representative of the sequence of coded images. This coding method comprises a motion estimation implementing the method described previously. This motion estimation is carried out on each pair of consecutive images ($I_1$, $I_2$) of the sequence. This motion estimation can be either a front motion estimation (the motion between $I_1$ and $I_2$ is then calculated) or a rear motion estimation (the motion between $I_2$ and $I_1$ is then calculated). Of course, the motion of the first image of the sequence is not estimated. The data which is introduced into the binary train is then: data for describing the first image, data concerning the structure of the start mesh used for estimating motion and the motion vectors of each image issued from the motion estimation. The data relating to the first image is the structural data of a mesh used to describe the first image and data concerning the luminance, chrominance and positions of the nodes of this mesh. The mesh used for describing the first image of the sequence can in fact differ from that used for estimating motion and may in particular comprise more mesh levels. As a variant, it is possible to carry out a front motion estimation and a rear motion estimation according to the motion estimation method of the invention and then introduce into the binary train, for each image, motion vectors which would be a linear combination of the motion vectors from the two motion estimations.

Before being introduced into the binary train, the data of the first image of the sequence is coded differentially. In addition, all the data concerning luminance, chrominance and position to be introduced into the binary train are quantified and compressed before being introduced into the binary train so as to limit the number of possible values and reduce the amount of data to be transmitted or stored.

According to the invention, it is also possible to introduce into the binary train for each image whose motion has been estimated a detection bit indicating whether or not the motion estimation of this image has generated overturnings of meshes. If this is the case, a specific value is then reserved for the motion vectors of the nodes of the detected overturning areas. For example, the value 0 is allocated to the motion vectors of the overturning areas and the value of the other motion vectors is increased by one unit. The motion vectors with the value 0 are used for detecting overturning areas in reception. The size k of the disk corresponding to the faulty area is then introduced into the binary train so as to determine the nodes belonging to this area. It is also possible to allocate the value 0 to all the nodes of the faulty areas. It then becomes pointless to transmit the size of the k-disk.

Data for describing the faulty areas of each image is then introduced into the binary train after the motion vectors. This data is for example obtained via an approximation by finite elements or by applying a discrete cosine transform or a wavelet transform on the portion of the image corresponding to these faulty areas.

As a variant, the data for describing the faulty areas introduced into the binary train are the optimised values of the luminance and chrominance of the nodes of the set S, the optimisation of these values consisting of modifying these values so that they represent as best as possible these faulty areas. If the meshing is hierarchical, this optimisation can be effected in two different ways:

either the optimisation is carried out for all the faulty areas of the image in question on all the nodes of the set $S_N$ (the finest mesh); this optimisation can then be carried out by using a hierarchical approach (optimisation of the values of the nodes of $S_0$, then values of the nodes of $S_1$ by being based on those of the nodes of $S_0$, . . . up to $S_N$) or by directly optimising the values of the nodes of $S_N$;

or each faulty area of the image in question is processed individually and optimisation is then carried out on the nodes of the set $S_j$ belonging to the faulty area in question with $j \geq 1$, being the mesh level where the faulty area in question has appeared; similarly, this optimisation can be effected by following a hierarchical approach or by directly optimising the values of the nodes of the set $S_j$.

According to the hierarchical approach, it is possible to start optimisation of the values at a mesh level m>0 instead of starting at the level 0.

The optimisation of the luminance and chrominance values can be effected by a least mean square method which consists of minimising a criterion E' defined on the domain of the faulty area $\Omega$. This criterion is defined by the following expression:

$$E' = \int_\Omega \left| I(x, y) - \sum_{n=1}^M \psi_{P_n}(x, y) \cdot v(P_n) \right|^2 dx\, dy$$

where
  $P_n$ is a node with index number n of the mesh,
  M is the total number of nodes of the set S or $S_i$ in question,
  I(x, y) represents the luminance chrominance respectively) value of the pixel with coordinates (x, y),
  $\psi P_n$ is the interpolation function associated with the vertex $P_n$,
  $v(P_n)$ is the luminance (chrominance respectively) optimised value associated with the vertex $P_n$.

The operation for minimising this criterion is given in detail in the thesis entitled "Représentation et codage de séquences vidéo par maillages 2D déformables" by Patrick Lechat, page 106, IRISA, Rennes, October 1999.

In addition, on receipt, the decoding of the binary train produced by this coding method consists of:

decoding all the data included in the binary train, determining if the detection bit indicates the presence of faulty areas in the mesh during the motion estimation step of the images of the coding method, if this is the case, marking the faulty areas via the zero value motion vectors, decreasing by one unit the value of the non-zero value motion vectors, and recreating the sequence of images corresponding to the binary train.

What is claimed is:

1. Method for estimating the motion between two digital images $I_1$ and $I_2$ with luminance $Y_1$ and $Y_2$ and intended to generate for each point of coordinates x, y of the image $I_2$ a motion vector $\vec{d}(x, y)=(d_x, d_y)$ so as to form an image $\hat{I}_2$ from the image $I_1$ with luminance $\hat{Y}_2(x, y)=Y_1(x+d_x, y+d_y)$ which is an approximation of the image $I_2$ and comprising the following steps:

(a)—defining an initial model of finite elements comprising a mesh whose nodes are points of the image $I_1$, a motion vector at each node of said mesh, and an interpolation formula so as to calculate the value of the motion vector of each point of the image $I_1$ on the basis of the values of the motion vectors of the nodes of the mesh to which it belongs, (b)—optimising globally the values of all the motion vectors of the model according to a differential method, (c)—applying said motion vectors to said mesh of the initial model so as to generate a moved mesh representative of the image $\hat{I}_2$, (d)—determining faulty areas in said moved mesh, said faulty areas being determined so that they contain at least one or several meshes overturning or overlapping after applying the motion vectors, all said meshes of the moved meshwork overturning or overlapping after applying the motion vectors being contained in said faulty areas, (e)—creating a set S including all the nodes of the moved mesh contained in the faulty areas, (f)—taking up again the initial model defined in step (a), reinitialising the values of all the motion vectors of said initial model and re-optimising the values of the motion vectors of said model according to step (b) by excluding from the model the motion vectors of the nodes of said set S.

2. Method according to claim 1, characterised in that, instead of taking up again the initial model for reoptimisation of the motion vectors in step (f), a model is taken up corresponding to the model obtained at the end of an iteration of the optimisation carried out in step (b) for which the optimised motion vectors do not generate any overturning of meshes so as to reduce the processing time of step (f).

3. Method according to claim 1, characterised in that it further comprises the following steps to be carried out between steps (b) and (c):

(b1)—calculating a difference E between the image $\hat{I}_2$ and the image $I_2$ for each mesh of the model, (b2)—carrying out a finer mesh on a discrete fraction of all the meshes determined according to a criterion relating to the differences E and allocating a motion vector to each new mesh node, (b3)—marking the steps (b), (b1) and (b2) on the model obtained at the end of the preceding step (b2) until a stop criterion is satisfied.

4. Method according to claim 3, characterised in that, so as to carry out a finer mesh on a discrete fraction of all the meshes in step (b2), all the differences E calculated in step (b1) are compared with a threshold difference and those meshes whose differences E are greater than a threshold difference are subdivided into smaller meshes.

5. Method according to claim 3, characterised in that said stop criterion is a predetermined number of meshes in the model to be attained at the end of step (b2).

6. Method according to claim 3, characterised in that said stop criterion of step (b3) is satisfied when the differences E of all meshes of the model obtained at the end of the preceding step (b2) are less than a threshold difference.

7. Method according to claim 1, characterised in that each faulty area is a k-disk of an area including at least one overturning or overlapping mesh after application of the motion vectors.

8. Method according to claim 3, characterised in that it further comprises a step for correcting the position of the nodes of the faulty areas so as to improve the convergence of step (b) for estimating the motion of images with respect to the image $I_2$.

9. Method according to claim 1, characterised in that the images $I_1$ and $I_2$ belong to a given sequence of digital images and in that the image $I_2$ is consecutive to $I_1$ in said sequence of digital images.

10. Method according to claim 1, characterised in that the images $I_1$ and $I_2$ belong to a given sequence of digital images and in that the image $I_1$ is consecutive to $I_2$ in said sequence of digital images.

11. Application of the motion estimation method according to claim 1 for coding a sequence of digital images.

12. Method for coding a sequence of digital images for producing a binary train representative of said sequence of images, characterised in that it comprises the following steps:

estimating a front motion estimation for each pair of consecutive images of the sequence by implementing the motion estimation method according to one of claim 1, and introducing into the binary train data for describing the first image of said sequence of images, data concerning the structure of the mesh used for the motion estimation step, the motion vectors obtained at the end of the motion estimation step of each image and faulty data for representing the faulty areas determined during the motion estimation step.

13. Method for coding a sequence of digital images so as to produce a binary train representative of said sequence of images, characterised in that it comprises the following steps:

carrying our a rear motion estimation for each pair of consecutive images of the sequence by implementing the motion estimation method according to claim 1, and introducing into the binary train data for describing the first image of said sequence of images, data concerning the structure of the mesh used for the motion estimation step, the motion vectors obtained at the end of the motion estimation step of each image, and faulty data for representing the faulty areas determined during the motion estimation step.

14. Method for coding a sequence of digital images for producing a binary train representative of said sequence of images, characterised in that it comprises the following steps:

carrying out a front and a rear motion estimation for each pair of consecutive images of the sequence by implementing the mentioned motion estimation method for each of the motion estimations according to claim 1, and introducing into the binary train data for describing the first image of said sequence, data concerning the structure of the mesh used for the motion estimation step, motion vectors which are for each image a linear combination of the motion vectors obtained at the end of the two preceding motion estimation steps, and faulty data for representing the faulty areas determined during the two preceding motion estimation steps.

15. Method according to claim 12, characterised in that the binary train further comprises a detection bit indicating whether the motion estimation step of each of the images has determined faulty areas in the mesh.

16. Method according to claim 12, characterised in that the value of the motion vectors obtained at the end of said motion estimation step is modified before introducing said motion vectors into the binary train.

17. Method according to claim 16, characterised in that the value zero is allocated to the motion vectors of the nodes of the faulty areas and in that the value of the other motion vectors of the model is increased by one.

18. Method for decoding a binary train representative of a sequence of images and produced by the coding method according to claim 17, characterised in that it comprises the following steps:

decoding all the data included in said binary train, determining whether the detection bit indicates the presence of faulty areas of the mesh during the motion estimation step of the images of the coding method, if this is the case, marking said faulty areas via the zero value motion vectors, decreasing by one unit the value of the positive value motion vectors, and recreating said sequence of images.

19. Method according to claim 12, characterised in that the faulty data introduced into the binary train is obtained by applying a discrete cosine transform to the corresponding portion of the digital image.

20. Method according to claim 12, characterised in that the faulty data introduced into the binary train is obtained by applying a wavelet transform to the corresponding portion of the digital image.

21. Method according to claim 12, characterised in that the faulty data introduced into the binary train is obtained by applying a finite elements approximation method to the corresponding portion of the digital image.

22. Method according to claim 12, characterised in that the faulty data introduced into the binary train is luminance, chrominance and possibly position values of the nodes of the set S.

23. Method according to claim 22, characterised in that the luminance and chrominance values of the nodes of the set S are optimised before being introduced into the binary train.

24. Method according to claim 23, characterised in that the position values of the nodes of the set S are optimised before being introduced into the binary train.

25. Method according to claim 12, characterised in that the faulty data introduced into the binary train is luminance, chrominance and position values of the nodes of the set $S_N$ relating to the highest mesh level (N).

26. Method according to claim 25, characterised in that the luminance and chrominance values of the nodes of the set $S_N$ are optimised before being introduced into the binary train.

27. Method according to claim 26, characterised in that the position values of the nodes of the set $S_N$ are optimised before being introduced into the binary train.

28. Method according to claim 26, characterised in that the optimisation of the luminance and chrominance values of the nodes of the set $S_N$ relating to the highest mesh level (N) is effected according to a hierarchical approach by first of all optimising the luminance and chrominance values of the nodes of the set $S_0$ corresponding to the coarsest mesh level, then the luminance and chrominance values of the nodes of the intermediate sets $S_i$ by being based on the luminance and chrominance values of the nodes of the lower mesh level $S_{i-1}$, until reaching the highest mesh level (N).

29. Method according to claim 28, characterised in that optimisation according to a hierarchical approach of the luminance and chrominance values of the set $S_N$ is effected by starting by optimising the luminance and chrominance values of the nodes of the set $S_m$ with m>0.

30. Method according to claim 12, characterised in that the faulty data introduced into the binary train are luminance, chrominance and position values of the nodes of the set $S_j$ with j≧1, being the mesh level where the faulty area in question has appeared.

31. Method according to claim 30, characterised in that the luminance and chrominance values of the nodes of the set $S_j$ are optimised before being introduced into the binary train.

32. Method according to claim 31, characterised in that the position values of the nodes of the set $S_j$ are optimised before being introduced into the binary train.

33. Method according to claim 31, characterised in that the optimisation of the luminance and chrominance values of the nodes of the set $S_j$ is effected according to a hierarchical approach by first of all optimising the luminance and chrominance values of the nodes of the set $S_0$ corresponding to the coarsest mesh level, then the luminance and chrominance values of the nodes of the intermediate sets $S_i$ by being based on the luminance and chrominance values of the nodes of the lower mesh level $S_{i-1}$ until reaching the mesh level j.

34. Method according to claim 33, characterised in that the optimisation according to a hierarchical approach of the luminance and chrominance values of the set $S_j$ is effected by starting by optimising the luminance and chrominance values of the nodes of the set $S_m$ with 0<m<j.

* * * * *